/

US006275706B1

(12) United States Patent
Rune

(10) Patent No.: US 6,275,706 B1
(45) Date of Patent: Aug. 14, 2001

(54) MOBILE TELECOMMUNICATIONS NETWORK AND METHOD FOR IMPLEMENTING AND IDENTIFYING HIERARCHICAL OVERLAPPING RADIO COVERAGE AREAS

(75) Inventor: Johan Rune, Lidingö (SE)

(73) Assignee: Telefonaktiebolaget L M Ericsson, Stockholm (SE)

( * ) Notice: Subject to any disclaimer, the term of this patent is extended or adjusted under 35 U.S.C. 154(b) by 0 days.

(21) Appl. No.: 09/189,330

(22) Filed: Nov. 9, 1998

(51) Int. Cl.[7] ............................................. H04Q 7/20
(52) U.S. Cl. .................. 455/456; 455/432; 455/449; 455/443
(58) Field of Search .................. 455/432, 435, 455/443, 444, 446, 448, 449, 456, 422, 433, 445

(56) References Cited

U.S. PATENT DOCUMENTS

| | | | |
|---|---|---|---|
| 5,212,822 | 5/1993 | Fukumine et al. .................. | 455/33.1 |
| 5,305,466 | 4/1994 | Taketsugu ........................... | 455/33.1 |
| 5,361,396 | * 11/1994 | Onoe et al. ......................... | 455/435 |
| 5,548,816 | * 8/1996 | DeVaney ............................. | 455/456 |
| 5,561,840 | 10/1996 | Alvesalo et al. .................... | 455/33.1 |
| 5,713,073 | 1/1998 | Warsta ................................ | 455/56.1 |
| 5,737,731 | 4/1998 | Lester et al. ........................ | 707/1 |
| 5,745,481 | * 4/1998 | Phillips et al. ...................... | 370/313 |
| 5,842,128 | * 11/1998 | Kito et al. .......................... | 455/435 |
| 6,081,723 | * 6/2000 | Mademann ......................... | 455/456 |

FOREIGN PATENT DOCUMENTS

| | | |
|---|---|---|
| 0 859 531 | 8/1998 | (EP) . |
| WO 94/13114 | 6/1994 | (WO) . |
| WO 94/16529 | 7/1994 | (WO) . |
| WO 98/32305 | 7/1998 | (WO) . |
| WO 98/34430 A1 | 8/1998 | (WO) . |
| WO 98/49846 | 11/1998 | (WO) . |

OTHER PUBLICATIONS

U.S. application No. 09/188,926, Related U.S. Application, filed Nov. 9, 1998.

Standard European Search Report dated Jul. 27, 1999.

\* cited by examiner

Primary Examiner—Dwayne Bost
Assistant Examiner—Erika A. Gary
(74) Attorney, Agent, or Firm—Jenkens & Gilchrist, P.C.

(57) ABSTRACT

A mobile telecommunications network and method for identifying hierarchical and overlapping radio coverage areas including a combination of at least one location area and at least one routing area. More specifically, the mobile telecommunications network includes a first switching center and a second switching center coupled to a controller that manages a plurality of location areas and a plurality of routing areas. The location areas and routing areas are also controlled by the first switching center and the second switching center, respectively. The mobile telecommunications network further includes a plurality of cells, where the cells accommodate at least one of the location areas and at least one of the routing areas. Lastly, the mobile telecommunications network further includes an identification system for identifying at least one combination identifier representative of the at least one location area and the at least one routing area accommodated by each cell.

86 Claims, 8 Drawing Sheets

MOBILE TELECOMMUNICATIONS NETWORK AND METHOD FOR IMPLEMENTING AND IDENTIFYING HIERARCHICAL OVERLAPPING RADIO COVERAGE AREAS

CROSS REFERENCE TO RELATED APPLICATIONS

This application is related to a U.S. Application filed on Nov. 9, 1998 in the name of Johan Rune and entitled "MOBILE TELECOMMUNICATIONS NETWORK AND METHOD FOR IDENTIFYING CONTIGUOUS AND OVERLAPPING LOCATION AREAS" Ser. No. 09/188,926 which is hereby incorporated by reference herein.

BACKGROUND OF THE INVENTION

1. Technical Field of the Invention

The present invention generally relates to the telecommunications field and, in particular, to a mobile telecommunications network and method for implementing and identifying hierarchical overlapping radio coverage areas including at least one location area and at least one routing area.

2. Description of Related Art

A mobile telecommunications network may have many types of architectures according to a variety of standards such as the Personal Digital Cellular (PDC) standard used in Japan, or the Global System for Mobile Communications (GSM) and General Packet Radio Service (GPRS) Standards used in Europe.

The mobile telecommunications network having the architecture in accordance with the PDC standard generally includes a multitude of contiguous location areas, where each location area effectively divides an arbitrary geographic area into a plurality of cells. The PDC standard also supports a feature where the location areas can be overlapped to avoid a "ping-pong" effect and reduce the concentration of location updates within cells located along a border between contiguous location areas.

The "ping-pong" effect occurs when the mobile terminal moves back-and-forth across the border between contiguous location areas and, as a result of such movement, initiates multiple location updates with the mobile telecommunications network. The initiation of multiple location updates or location registrations is problematic due to the utilization of valuable resources by the mobile telecommunications network. Therefore, a definite advantage of the PDC standard is the support and availability of overlapping location areas.

Referring to the GSM/GPRS standards, the architecture of the mobile telecommunications network according to such standards permits the use of hierarchical location area structures in which location areas cover large geographical areas and routing areas (same as location area but used on a lower hierarchical level) cover smaller geographical areas. The location areas of the GSM standard represent a higher hierarchical level used for supporting circuit switched calls. And, the routing areas of the GPRS standard represent a lower hierarchical level used for supporting packet data switched calls. Of course, a definite advantage associated with the GSM/GPRS standards is the availability of hierarchical location area structures.

Unfortunately, the current mobile telecommunications networks do not support the combined use of the overlapping feature of the PDC standard and the hierarchical location area structures feature of the GSM/GPRS standards.

It is believed that the failure in supporting the combined use of such features may be due to the difficulty associated with identifying the multiple location areas and multiple routing areas that can be accommodated by each one of the cells.

Also problematic, is the coupling of the overlapping feature of the PDC standard with temporary mobile subscriber identity (TMSI) and temporary logical link identity (TLLI) features of the GSM/GPRS standards. Each of the TMSI and TLLI features currently operate in a situation where the mobile user (please note that mobile terminal and mobile user are used interchangeably herein) is assigned a temporary identifier that is used instead of a real subscriber identity when communicating across a radio interface. Unfortunately, the problem occurs when the overlapping feature is combined with the TMSI and TLLI features in that the temporary identifiers may no longer be unique within cells accommodating multiple location areas and/or multiple routing areas.

Accordingly, there is a need for a method and mobile telecommunications network that combines the features of the hierarchical location area structures associated with the GSM/GPRS standards with the overlapping feature associated with the PDC standard. There is also a need for a method and mobile telecommunications network for identifying the newly formed hierarchical overlapping radio coverage areas including at least one routing area and at least one location area. These and other needs are satisfied by the mobile telecommunications network and method of the present invention.

SUMMARY OF THE INVENTION

The present invention is a method and mobile telecommunications network for identifying hierarchical and overlapping radio coverage areas including a combination of at least one location area and at least one routing area. More specifically, the mobile telecommunications network includes a first switching center and a second switching center coupled to a controller that manages a plurality of location areas and a plurality of routing areas. The location areas and routing areas are also controlled by the first switching center and the second switching center, respectively. The mobile telecommunications network further includes a plurality of cells, where the cells accommodate at least one of the location areas and at least one of the routing areas. Lastly, the mobile telecommunications network further includes an identification system for identifying at least one combination identifier representative of the at least one location area and the at least one routing area accommodated by each cell.

In accordance with the present invention, a mobile telecommunications network and method are provided that effectively enables the combined use of an overlapping feature of the PDC standard and a hierarchical location area structures feature of the GSM/GPRS standards.

Further in accordance with the present invention, there is provided a mobile telecommunications network and method capable of operating according to third generation standards including the Universal Mobile Telecommunications System (UMTS) and the International Mobile Telecommunications 2000 (IMT-2000).

Also in accordance with the present invention, there is provided a first embodiment of a method and mobile telecommunications network where a base transceiver station located in a cell operates to broadcast at least two identifiers (e.g., location area identifier and routing area identifier) representative of at least one location area and at least one routing area accommodated by the cell.

Further in accordance with the present invention, there is provided a second embodiment of a method and mobile telecommunications network where a base transceiver station located in a cell operates to transmit a combined location code representative of at least one location area and a combined routing code representative of at least one routing area accommodated by the cell.

BRIEF DESCRIPTION OF THE DRAWINGS

A more complete understanding of the method and apparatus of the present invention may be had by reference to the following detailed description when taken in conjunction with the accompanying drawings wherein:

FIG. 5 is a diagram illustrating exemplary location updates and routing updates that may be initiated by a roaming mobile terminal and a mobile terminal being turned on;

DETAILED DESCRIPTION OF THE DRAWINGS

Figure 1:
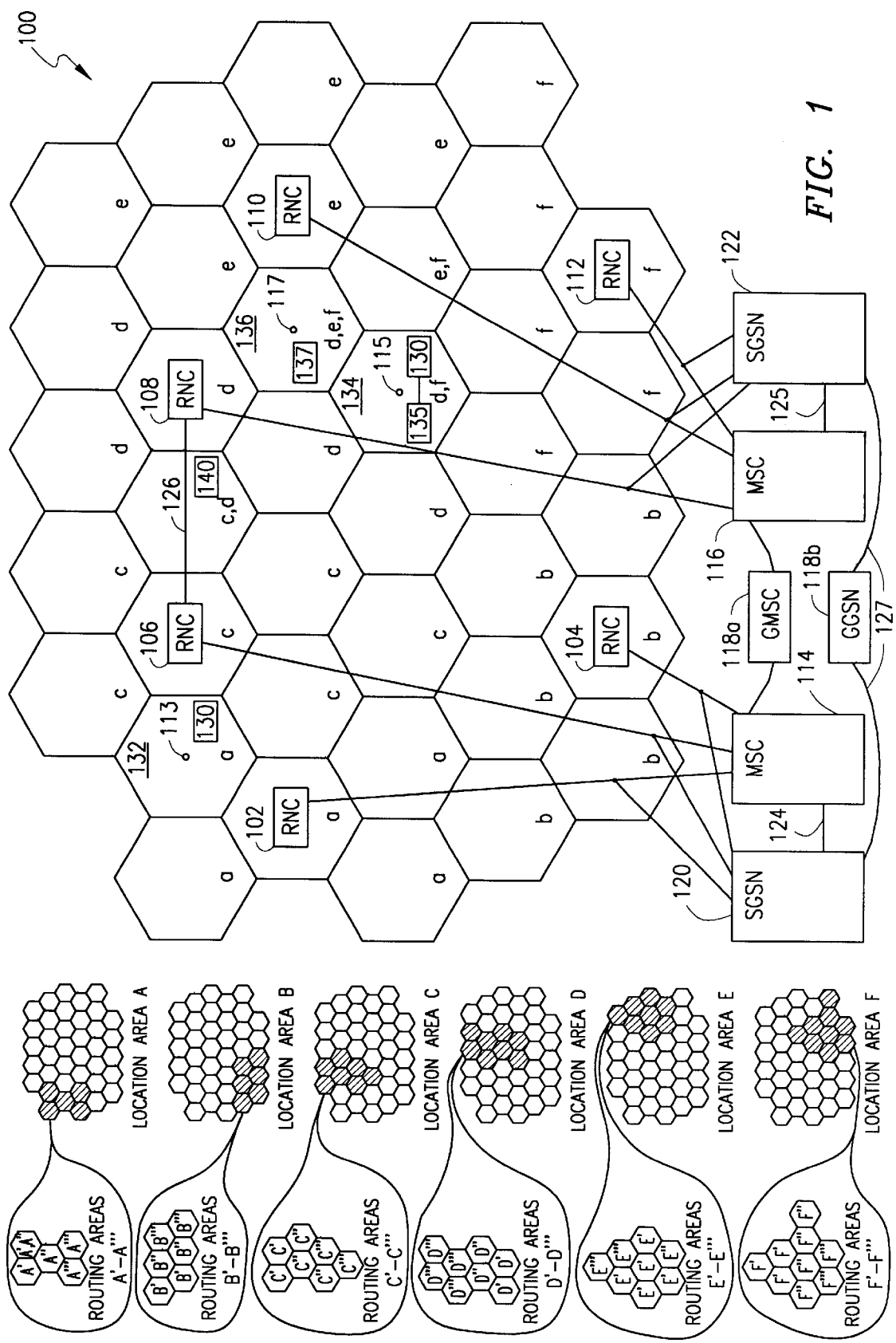
FIG. 1 is a diagram illustrating the general architecture of a mobile telecommunications network incorporating hierarchical overlapping location areas and routing areas in accordance with the present invention.

Referring to the Drawings, wherein like numerals represent like parts throughout FIGS. 1–8, there are disclosed two embodiments of an exemplary mobile telecommunications network 100 in accordance with the present invention.

Although the mobile telecommunications network 100 will be discussed with reference to third generation standards (e.g., Universal Mobile Telecommunications System (UMTS) and International Mobile Telecommunications 2000 (IMT-2000)) incorporating an overlapping feature based on the PDC standard and a hierarchical location area structures feature based on the GSM/GPRS standards, those skilled in the art will appreciate that other standards and specifications may also utilize the principles of the present invention. Accordingly, the mobile telecommunications network 100 described should not be construed in such a limited manner.

In order to better describe the present invention, detailed descriptions about the specifics of the two embodiments associated with the identification of hierarchical overlapping location areas and routing areas within the mobile telecommunications network 100 are deferred pending a discussion about the architecture of hierarchical overlapping location and routing areas forming the mobile telecommunications network.

Referring to FIG. 1, there is a diagram illustrating the architecture of the mobile telecommunications network 100 incorporating hierarchical overlapping location areas and routing areas in accordance with the present invention. It should be noted that the illustrated configuration of the mobile telecommunications network 100 is only one of many possible configurations that may form the mobile telecommunications network.

For example, there need not be a one-to-one relationship between controllers, mobile switching centers, base transceiver stations, location areas and routing areas as described below. Instead, there may be several location/routing areas served by one controller, and a single location/routing area may include cells that are controlled by more than one controller. The same relationship could be true for mobile switching centers and location/routing areas. In fact, some mobile telecommunications networks do not have controllers and, as such, directly connect the base transceiver stations to the mobile switching centers.

The mobile telecommunications network 100 can use either or both of a plurality of contiguous location areas A–C and overlapping location areas D–F for handling circuit switched calls within a particular geographic area. Each location area A–F includes the group of cells a–f and a radio network controller (RNC) 102, 104, 106, 108, 110 and 112, respectively. The RNCs 102, 104, 106, 108, 110 and 112 in addition to being similar to known base station controllers may interface with one another by way of line 126 (only one shown).

As an illustration, the RNC 102 provides mobile service and manages the location area A and cells a, while the RNC 110 provides mobile service and manages the location area E and cells e. Each cell a–f includes a base transceiver station (BTS) 113, 115 and 117 (only three are shown) for transmitting and receiving mobile telecommunications preferably using mobility management and call control protocols similar to ones defined in the GSM standard. In addition, the RNCs 102, 104, 106, 108, 110 and 112 and BTSs 113, 115 and 117 are collectively referred to as a radio access network (RAN) which generally has responsibility for radio related functions.

A number of the RNCs 102, 104, 106, 108, 110 and 112 can be associated with any number of mobile switching centers (MSCs) 114 and 116. As an illustration, the RNCs 102, 104 and 106 can be controlled by the MSC 114, and the RNCs 108, 110 and 112 may be controlled by the MSC 116. The MSCs 114 and 116 are, in turn, connected to a gateway mobile switching center (GMSC) 118a, which generally functions as an interface between the mobile telecommunications network 100 and, for example, a public switched telephone network (PSTN) (not shown).

In addition to the location areas A–F used in handling circuit switched calls, the mobile telecommunications network 100 can incorporate either or both of a plurality of a contiguous routing areas A'–A''', B'–B''' and C'–C''' and overlapping routing areas D'–D''', E'–E''' and F'–F''' for handling packet switched data calls. The routing areas A'–F''' represent a lower hierarchical level as compared to a higher hierarchical level represented by the location areas A–F. Each routing area A'–F''' may be accommodated by at least one of the cells a–f and managed by one of the RNCs 102, 104, 106, 108, 110 or 112 in a similar manner as mentioned above with respect to the location areas A–F. It should be understood that any one of the cells a–f can accommodate a combination of one or more location areas and routing areas A'–F'''.

Each of the RNCs 102, 104, 106, 108, 110 and 112 connect to a serving general packet radio service support node (SGSNs) 120 and 122 (two shown) that control a service area including one or more routing areas. As an illustration, the RNCs 102, 104 and 106 can be controlled by the SGSN 120 that manages the service area including routing areas A'–C''', and the RNCs 108, 110 and 112 may be controlled by the SGSN 122 that manages another service area including routing areas D'–F'''. The SGSNs 120 and 122 are, in turn, connected by way of lines 127 to a GGSN 118b (Gateway GPRS Support Node). It should be understood that a routing area may well cross a SGSN service area border to permit routing area overlapping around the SGSN service area borders.

The SGSNs 120 and 122, MSCs 114 and 116 and GMSC 118a and GGSN 118b are collectively known as a core network which has the responsibility for functions including, for example, mobility management, call control, supplementary services and charging. In addition, the SGSNs 120 and 122 may interface with the MSCs 114 and 116 by way of lines 124 and 126, respectively.

Referring to FIGS. 2–8, there are illustrated the first embodiment (FIGS. 2–6) and the second embodiment (FIGS. 7–8) associated with identifying hierarchical overlapping location areas and routing areas within the mobile telecommunications network 100. The identification of hierarchical overlapping location areas and routing areas and subsequent transmitting of corresponding identifiers (described later) enables a mobile terminal 130 (FIG. 1) to keep track of which location area and/or routing areas it is presently registered to operate within by comparing the transmitted identifiers with stored identifiers. And, if there is no match then a location update and/or a routing update is initiated by the mobile terminal 130 to register with a newly entered location area or routing area. Generally, the mobile telecommunications network 100 is informed whenever the mobile terminal 130 changes location area or routing area so that the mobile telecommunications network can forward incoming traffic to the mobile terminal.

Figure 2:
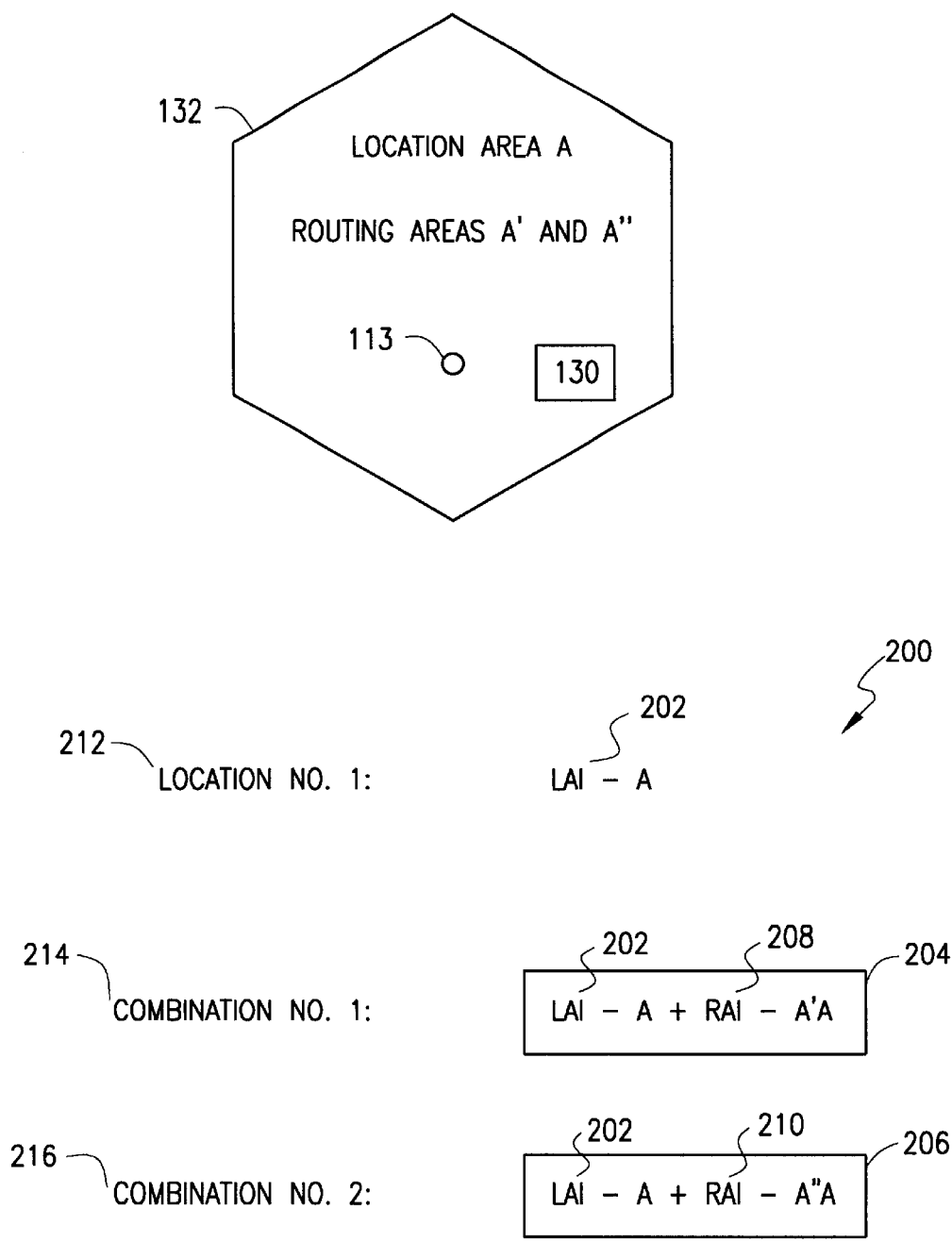
FIG. 2 is a diagram illustrating a first embodiment of an identification system used within the mobile telecommunications network shown in FIG. 1, where the identification system operates to identify a cell accommodating one location area and multiple routing areas.

Referring to FIG. 2, there is illustrated an identification system 200 of the first embodiment used to identify a cell accommodating one location area and two routing areas. As an illustration, a cell 132 (FIG. 1) accommodating the location area A and two of the routing areas A' and A" is described. The base transceiver station (BTS) 113 located in cell 132 operates to broadcast to the mobile terminal 130 a unique location area identifier (LAI-A) 202 associated with the location area A. The same LAI-A 202 is broadcast by all of the BTSs located in the cells accommodating the location area A. In addition, the BTS 113 also broadcasts a routing area identifier RAI-A'A 208 associated with the routing area A', and a second routing area identifier RAI-A"A 210 associated with the routing area A". Generally, the routing area identifiers RAI-A' and RAI-A" are only unique within the scope of the location area representing the higher hierarchical level.

Thereafter, the mobile terminal 130 and network 100 each form a first combination identifier 204 and a second combination identifier 206. The first combination identifier 204 includes the LAI-A 202 coupled with a first routing area identifier (RAI-A'A) 208. And, the second combination identifier 206 includes the LAI-A 202 coupled with a second routing identifier (RAI-A'A) 210. Likewise, the mobile terminal 130 and network 100 each assign a location number 212 for use instead of the LAI-A 202 and two combination numbers 214 and 216 for use instead of the two combination identifiers 204 and 206, respectively. The location number 212, first combination number 214 and the second combination number 216 are shorter than their corresponding identifiers 202, 204 and 206 and as such are more efficient to handle than the entire string of bits associated with the corresponding identifiers.

It should be understood that the combination numbers and location numbers are not used by the mobile terminal 130 during a location or routing update, because the mobile terminal has to indicate the location identifier and routing identifier in another cell where the previous location or routing update was performed. On the other hand, the combination number can be used to make a temporary identity unique within a border cell since the mobile terminal was assigned its temporary identity in a location area and routing area whose identities are included in the broadcast system information present in the cell.

Figure 3:
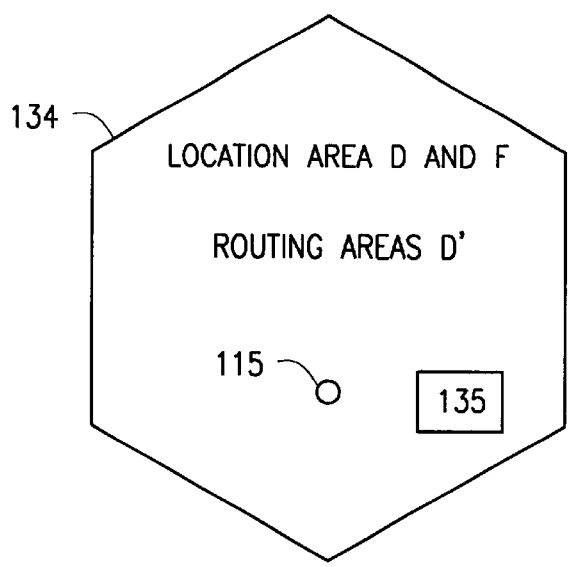
FIG. 3 is a diagram illustrating the first embodiment of the identification system used within the mobile telecommunications network shown in FIG. 1, where the identification system operates to identify another cell accommodating multiple location areas and one routing area.
Figure 3:
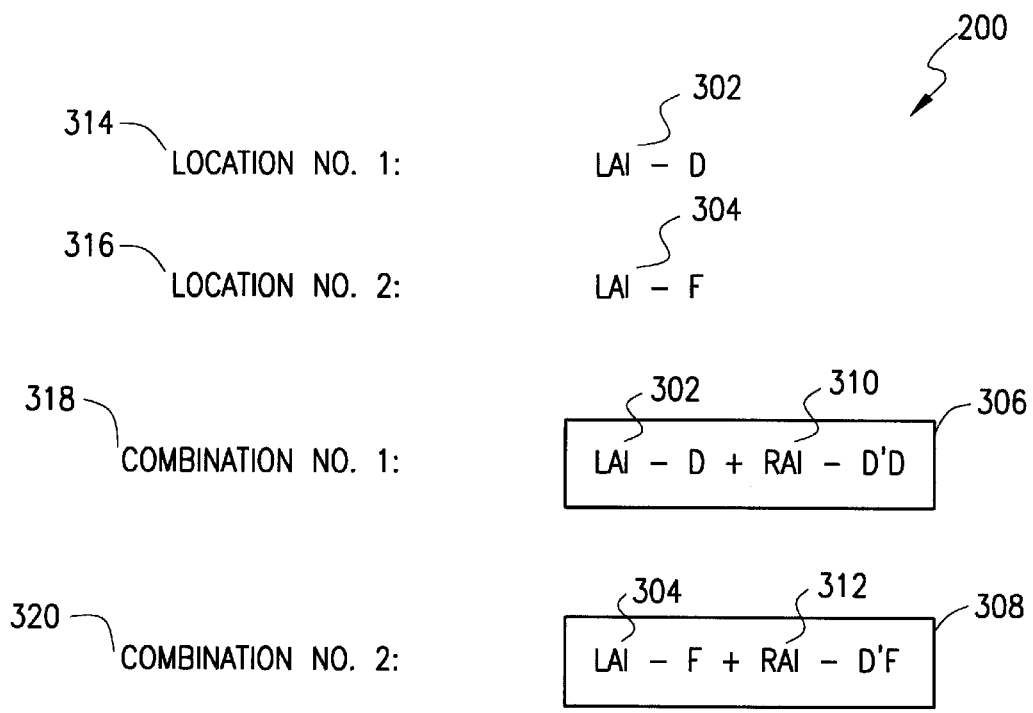

Referring to FIG. 3, there is illustrated the identification system 200 of the first embodiment used to identify a cell accommodating two location areas and one routing area. As an illustration, a cell 134 (FIG. 1) accommodating the location areas D and F and the routing area D' is described.

The BTS 115 located in cell 134 operates to broadcast to the mobile terminal 135 unique location area identifiers LAI-D 302 associated with the location area D and LAI-F 304 associated with the location area F. The same LAI-D 302 and LAI-F 304 are broadcast by all of the BTSs located in the cells accommodating the location areas D and F. In addition, the BTS 115 also transmits two routing area identifiers RAD-D'D 310 and RAI-D'F 312, both associated with the routing area D'.

Thereafter, the mobile terminal 135 and network 100 each form a first combination identifier 306 and a second combination identifier 308 which are not to be confused with the combination identifiers 204 and 206 described in FIG. 2. The first combination identifier 306 includes the LAI-D 302 coupled with a first routing area identifier (RAI-D'D) 310. And, the second combination identifier 308 includes the LAI-F 304 coupled with a second routing area identifier (RAI-D'F) 312. Likewise, the mobile terminal 135 and network 100 each assign a first location number 314 and a second location number 316 for use instead of the LAI-D 302 and LAI-F 304 and two combination numbers 318 and 320 for use instead of the two combination identifiers 306 and 308, respectively. Again, the first location number 314, second location number 316, first combination number 318 and the second combination number 320 are shorter than their corresponding identifiers 302, 304, 306 and 308 and as such are more efficient to handle than the entire string of bits associated with the corresponding identifiers. The first and second location numbers 314 and 316 and the first and second combination numbers 318 and 320 are not to be confused the location number 212 and combination numbers 214 and 216 described with reference to FIG. 2.

Figure 4:
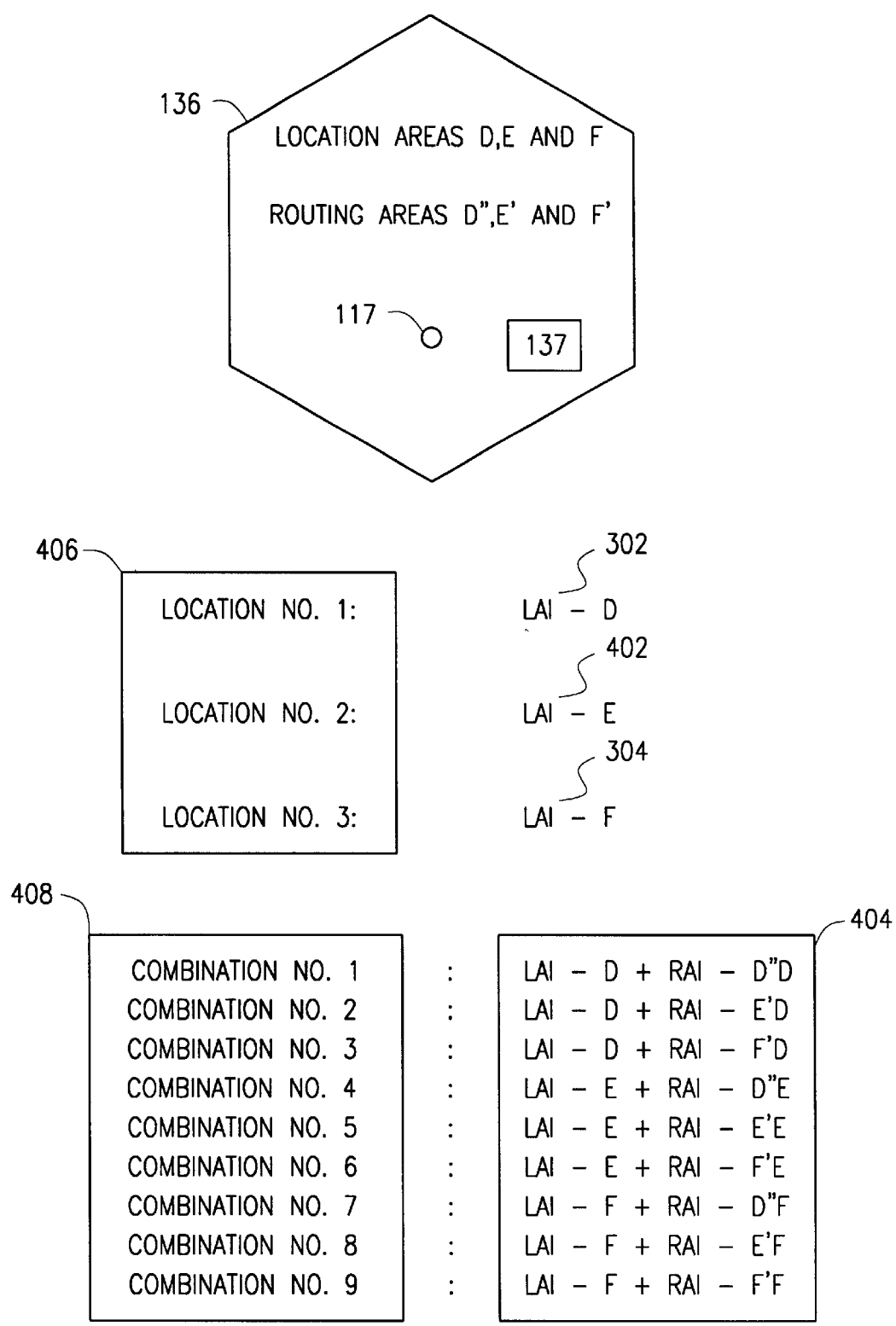
FIG. 4 is a diagram illustrating the first embodiment of the identification system used within the mobile telecommunications network shown in FIG. 1, where the identification system operates to identify yet another cell accommodating multiple location areas and multiple routing areas.

Referring to FIG. 4, there is illustrated the identification system 200 of the first embodiment used to identify a cell accommodating three location areas and three routing areas. As an illustration, a cell 136 (FIG. 1) accommodating the location areas D, E and F and the routing areas D",E' and F' is described.

The BTS 117 located in cell 136 operates to broadcast to the mobile terminal 137 unique location area identifiers LAI-D 302, LAI-E 402 and LAI-F 304 associated with location areas D, E and F, respectively. The same LAI-D, LAI-E and LAI-F are transmitted by all of the BTSs located in the cells accommodating the location areas D, E and F. In addition, the BTS 117 also broadcasts routing area identifiers RAI-D"D, RAI-D"E and RAI-D"F associated with routing area D", routing area identifiers RAI-E'D, RAI-E'E and RAI-E'F associated with routing area E' and routing area identifiers RAI-F'D, RAI-F'E and RAI-F'F associated with routing area F'.

Thereafter, the mobile terminal 137 and network 100 each form nine different combination identifiers 404 since nine is the total number of identification combinations possible when cell 136 (for example) accommodates three location areas and three routing areas. Each of the combination identifiers 404 includes one of the LAIs 302, 304 or 402 coupled with one of nine different routing area identifiers (e.g., RAI-D"D, RAI-F'F). The different LAIs 302, 304 and 402 and RAIs are combined to one another in a manner similar to the scheme described above with respect to FIGS. 2 and 3, and such combinations are illustrated in greater detail in FIG. 4.

Likewise, the mobile terminal 137 and network 100 each assign three different location numbers 406 for use instead of the LAI-D, LAI-E and LAI-F and nine different combination numbers 408 for use instead of nine combination identifiers 404. The location numbers 406 and the combination numbers 408 are shorter than their corresponding identifiers 302, 304, 402 and 404 and as such are more efficient to handle than the entire string of bits associated with the corresponding identifiers.

Figure 5:
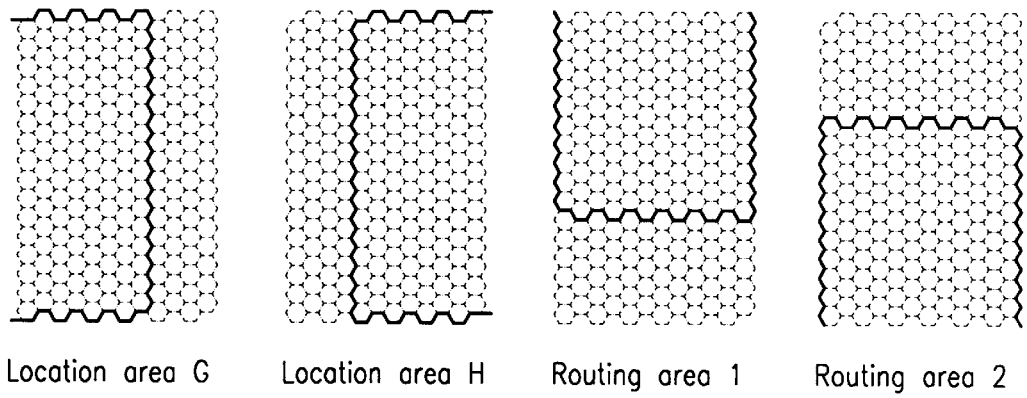
Figure 5:
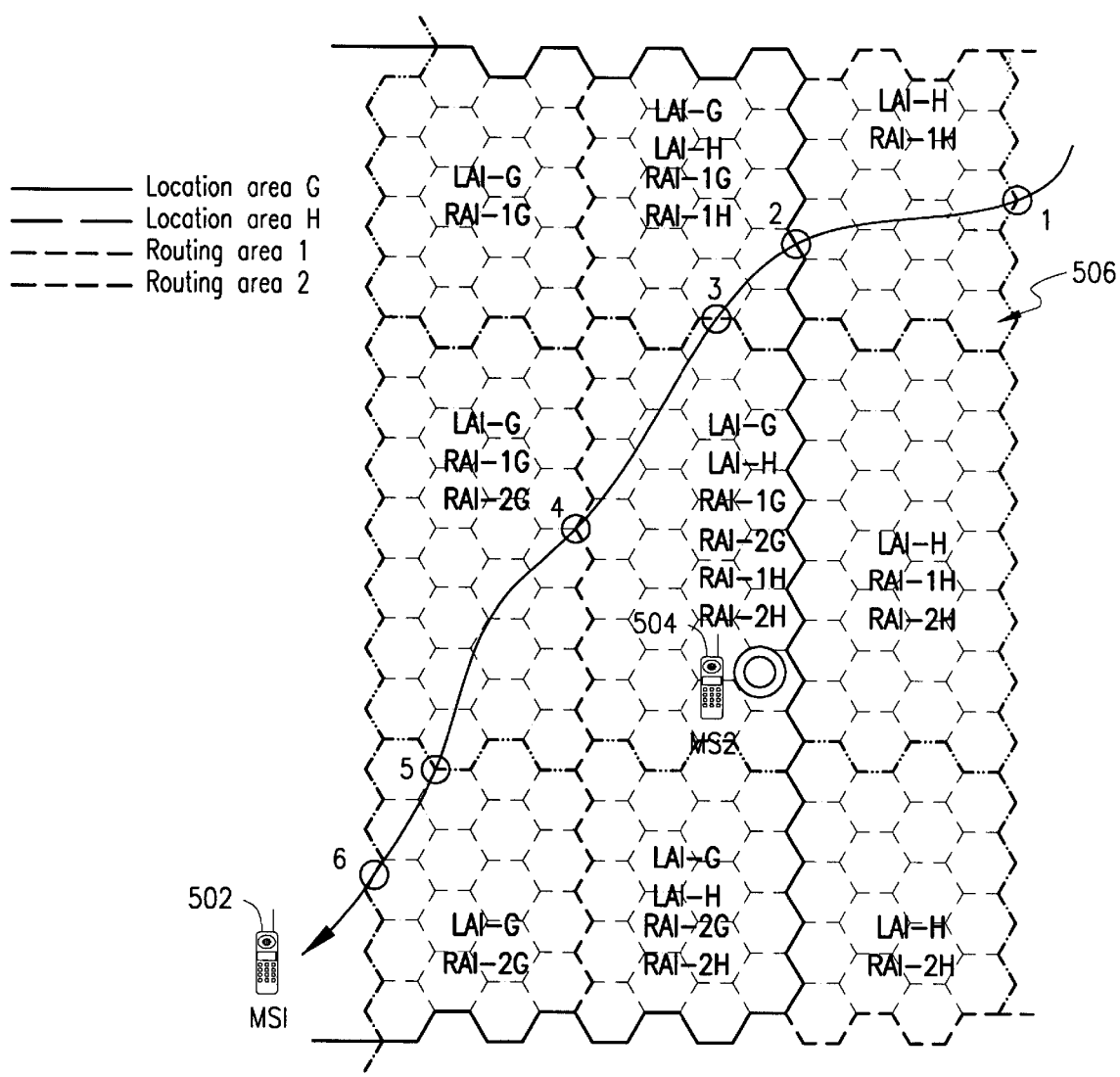

Referring to FIG. 5, there is a diagram illustrating exemplary location updates and routing updates that may be initiated by a roaming mobile terminal 502 and a mobile terminal 504 being turned (powered) on. In the illustrated example, the mobile terminals 502 and 504 are located at different positions within a group of cells 506, each cell accommodating location area G, location area H, routing area 1 and/or routing area 2.

The mobile terminal 502 roams through cells 506 and during such roaming operates to initiate either the location update and/or the routing update to keep track of which location area and/or routing areas it is presently registered to conduct cellular communications. The routing update can be classified into a real routing update and a virtual routing update, where the real routing update is used when the mobile terminal 502 has roamed into another one of the routing areas (e.g., routing area 1 to routing area 2). And, the virtual routing update can be used when the mobile terminal 502 has roamed within one of the routing areas where only the routing area identifiers have changed (because the location area has changed) and not the actual routing area.

As illustrated in FIG. 5, the roaming mobile terminal 502 crosses six borders associated with location area G, location area H, routing area 1 and/or routing area 2, and in crossing the borders initiates the following registration updates (described per border crossing):

1) Real routing update to routing area 1 (the previous routing area of the mobile terminal 502 is omitted in the FIG. 5). The new routing area identity addition (e.g., RAI includes an LAI and a routing area identity addition) is RAI-LH.
2) No location update or routing update. The mobile terminal 502 remains in location area H and routing area 1.
3) No location update or routing update. The mobile terminal 502 remains in location area H and routing area 1.
4) The mobile terminal 502 initiates the location update to location area G. The new location area identity is LAI-G. The routing update can be real (to routing area 2) or virtual (the mobile terminal remains in routing area 1), which is generally the choice of the mobile telecommunications network 100. If a real routing update to routing area 2 is chosen, then the new routing area identity addition is RAI-2G. If a virtual routing update is chosen, then the new routing area addition is RAI-1G.
5) If a virtual routing update was chosen at border crossing 4, then a real routing update to routing area 2 is performed at border crossing 5. The new routing area identity addition is RAI-2G. If a real routing update was chosen at border crossing 4, then no update is needed at border crossing 5.
6) Real routing update to some routing area which is not shown in FIG. 5.

Upon turning the power on within the stationary mobile terminal 504, one of the MSCs (not shown) determines whether to let the mobile terminal perform the location update to either location area G or H. The MSCs make the decision either dynamically or based on configuration data (see "preferred location area" parameter discussed later). Therefore, the new location area identity can be either LAI-G or LAI-H.

Likewise, one of the SGSNs (not shown) determines whether to let the mobile terminal 504 perform the routing update to either routing area 1 or 2. If location area G was chosen by the MSC or defined as the "preferred location area" in configuration data, then the new routing area identity addition can be either RAI-1G or RAI-2G. If location area H was chosen by the MSC or defined as the "preferred location area" in configuration data, then the new routing area identity addition can be either RAI-1H or RAI-2H.

It should be understood that there are many types of border crossings that can be made by a mobile terminal in addition to the many different configurations of location areas and routing areas which can form the mobile telecommunications network 100.

Also, it should be understood that only a portion of any LAI which makes all of the LAIs unique within the mobile telecommunications network 100 need be broadcast from the cells and a remaining portion of each of the LAIs needs to be broadcasted only once since the remaining portion is the same for all of the location areas within the mobile telecommunications network. The same is true for the RAIs.

Referring again to FIG. 1 and the temporary mobile subscriber identity (TMSI) feature briefly described in the Background Section, there is now described an extended TMSI identifier 150 used in accordance with the present invention. As mentioned earlier, the current TMSI feature associated with the GSM standard operates to avoid sending a real subscriber identity across a location area by assigning a TMSI temporary identifier to the mobile terminal 130, 135 or 137 (FIG. 1). However, when the current TMSI temporary identifier is used to identify (either during paging or during mobile originated accesses) a user or the mobile terminal 130, 135 or 135 located in overlapping location areas, then it is not unique because the current TMSI identifier is unique only within a single location area.

In addressing this problem, the location area identity (except the part of the location area identity which is common for all location areas in the network) of the location area where the TMSI identifier was originally assigned to the mobile terminal 130, 135 or 137 is combined with the TMSI identifier whenever the mobile telecommunications network 100 attempts to identify the user or mobile terminal in one of the cells (e.g., cell 134) which belongs to at least one location area other than the one location area in which the TMSI identifier was originally assigned. The combination of the TMSI identifier and the location area identity (LAI) is known as the extended TMSI identifier 150.

The extended TMSI identifier 150 operates to identify both the mobile terminal 130, 135 or 137 and the MSC 114 or 116 (FIG. 1) where data related to the mobile terminal is currently stored. To make the extended TMSI identifier 150 shorter it is enough to use the location number (e.g., location number 212 of FIG. 2) of the location area identifier (e.g., LAI-A 202) instead of the actual location area identity. It should be understood that during the location update, the extended TMSI temporary identifier need not be used since the old location area identity is already present in a location update request message.

Figure 6:
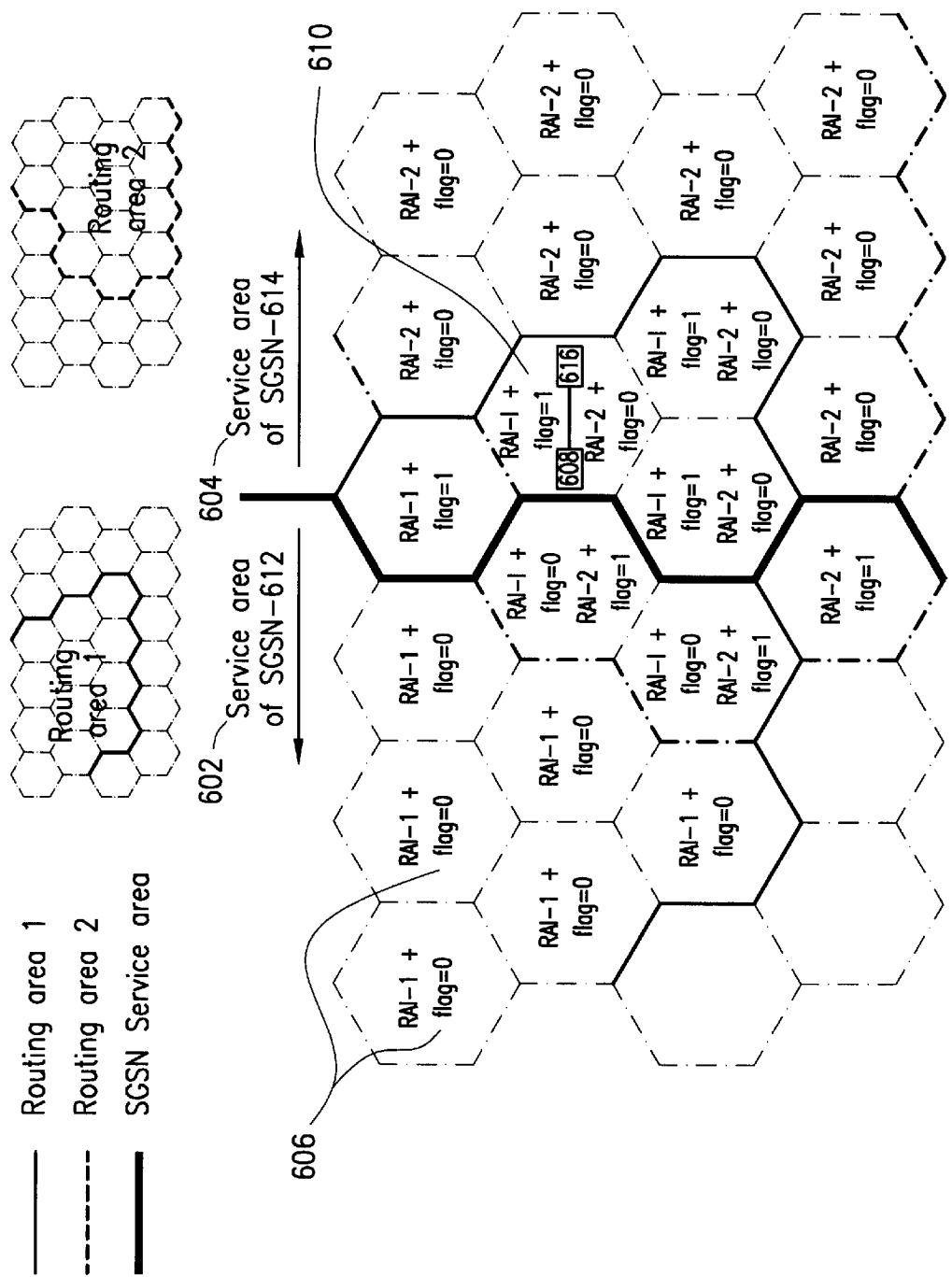
FIG. 6 is a diagram illustrating exemplary service areas (e.g., one or more routing areas) incorporating service area flags used in conjunction with a known temporary logical link identity (TLLI) feature.

Referring to FIG. 6, there is a diagram illustrating exemplary service areas 602 and 604 incorporating service area flags 606 used in conjunction with the known temporary logical link identity (TLLI) feature. As mentioned in the Background Section, the current TLLI feature associated with the GPRS standard operates to avoid sending a real subscriber identity across a service area formed by several routing areas 1 and 2 by assigning a TLLI temporary identifier to the mobile terminal 130, 135 or 137 (FIG. 1).

In addressing this problem, the service area flags 606 are introduced and appended to each routing area identity (RAI) associated with a cell. A setting (e.g., "0" or "1") of a particular service area flag 606 indicates, for example, whether or not a SGSN 612 in control of the routing area is different than a SGSN 614 in control of the actual cell 610 (i.e., in control of the service area). More specifically, the setting (e.g. "1") of the service area flag 606 (see cell 610) indicates whether a mobile terminal 608 is currently roaming outside the service area 602 of the SGSN 612 from which the mobile terminal was assigned the current TLLI temporary identifier. If such a situation is indicated (e.g., by setting the service area flag 606 to "1") this means that the TLLI temporary identifier alone can not be used to uniquely identify the mobile terminal 608 in the current cell 610. Therefore, the routing area identity of the routing area to which the mobile terminal 608 currently belongs, including the location area identity of the location area to which the routing area belongs, is combined with the TLLI temporary identifier 616 to make an extended TLLI temporary identifier unique and to unambiguously identify both the mobile terminal and the SGSN 612 where data related to the mobile terminal is currently stored (e.g., the SGSN 612 that assigned the current TLLI temporary identifier to the mobile terminal).

To make the extended TLLI temporary identifier 616 shorter it is enough to indicate the combination number (See FIGS. 2–4) of the combined location area identity and routing area identity instead of the actual combination of location area identity and routing area identity. The use of the combination number saves valuable resources (e.g., bits) when the extended TLLI temporary identifier 616 is transferred across the radio interface. The extended TLLI temporary identifier 616 can be used when the mobile terminal 608 contacts the mobile telecommunications network 100 (note the cells of FIG. 6 do not coincide with the cells a–f of FIG. 1) to enable the sending of data packets or it can be used as a mobile terminal address for paging messages directed to the mobile terminal.

It should be understood that during the routing update the extended TLLI temporary identifier 616 need not be used since the old location area identity and routing area identity are already present in a routing update request message.

Referring again to FIG. 1 where it is possible there is a situation where (for example) the MSC 114 responsible for the location area C in which the mobile terminal 140 is roaming will not always be the same as the MSC 116 in control of the current cell c. Of course, the same situation can occur for the SGSNs and routing areas. Therefore, when the mobile terminal 140 is roaming in the cell c belonging to its current location area C or current routing area C', but which is controlled by the MSC 116 or SGSN 122, all accesses (e.g., paging, mobile originating calls, location update requests) are routed via the MSC 116 or SGSN 122 in control of the current cell and the MSC 114 or SGSN 120 responsible for the location area C or routing area C' in which the mobile terminal is roaming.

If inter-connected RNCs (e.g., RNC 106 and 108) are used, such interface lines (e.g., 126) can be used to route the accesses to and/or from the MSC 114 and SGSN 120 responsible for the current location area C and routing area C'. In any case, subscriber related data is stored in the SGSN 120 responsible for the routing area C' in which the mobile terminal 140 is roaming and/or in the MSC 114 responsible for the location area C in which the mobile terminal is roaming.

For mobile originating calls an alternative approach is to let the MSC 116 or the SGSN 122 in control of the used cell handle the call, by remotely accessing subscriber related data stored in the MSC 114 responsible for the current location area C or in the SGSN 120 responsible for the current routing area C'.

As mentioned above, the routing area identity (RAI) consists of the location area (LAI) with a routing area identity addition that has only a local significance within the location area. Therefore, the SGSN 120 or 122 should know which location area is used when it assigns the RAI to the mobile terminal 130, 135 or 137. However, this assignment becomes a problem during a combined location update and routing update procedure, since the new location area identity is assigned by the MSC 114 or 116 while the new routing area identity is assigned by the SGSN 120 or 122. If the optional interfaces 124 and 125 between the MSC 114 and 116 and the SGSNs 120 and 122 are implemented (a "coordinated case"), then the problem is solved by sending the new location area identity from the MSC 114 or 116 to the SGSN 120 and 120 over the interface 124 and 125, respectively.

However, if the interface 124 and 125 is not implemented (an "uncoordinated case") some other solution is required. A possible solution for the uncoordinated case is that for each cell there is assigned the "preferred location area" (mentioned earlier) that can be used with location updates performed in a particular cell. The "preferred location area" may be considered configuration data which is known to both the MSC 114 or 116 and the SGSN 120 or 122 connected to and the RNCs 102, 104, 106, 108, 110 or 112 in control of the cells a–f. Using the "preferred location area" parameter the SGSNs 120 or 122 know which location area identity to use when assigning a new routing area identity to the mobile terminal 130, 135 or 127 during the combined location update and routing update.

It should be understood that when a routing area (not shown) is split by a location area border, the routing update is also performed by the mobile terminal initiating the location update after crossing the location area border, even though the mobile terminal may still be in the same routing area. The reason for this is that when a new location area identity is assigned, the old routing area identity (which is the old location area identity with a routing area identity addition) is no longer valid for the mobile terminal. Therefore, the routing area identity combination should be updated to include the new location area identity and a new routing area identity which is valid in the new location area.

Figure 7:
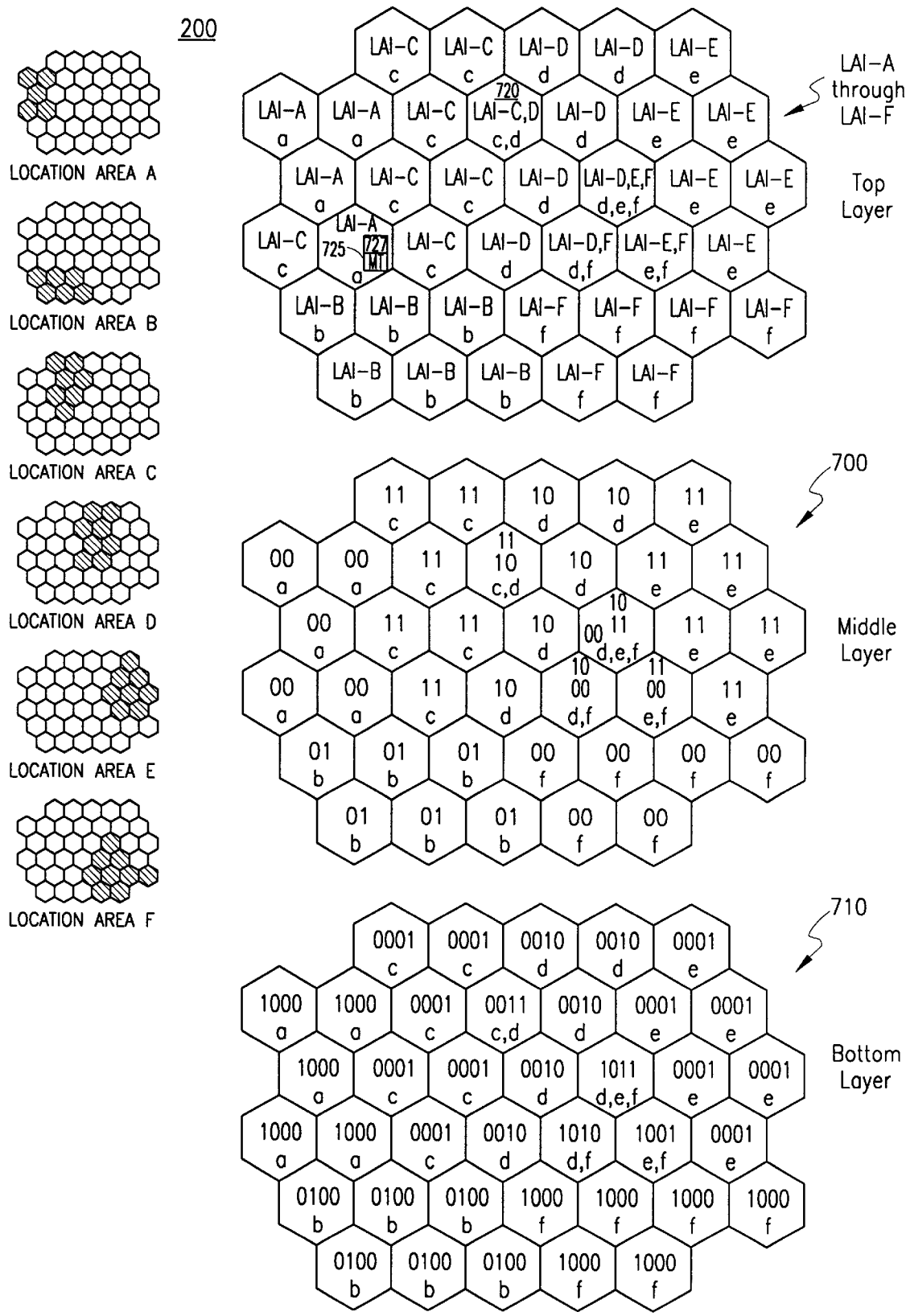
FIG. 7 is a diagram illustrating a second embodiment of the identification system for identifying hierarchical overlapping location areas.

Referring to FIG. 7, there is illustrated a second embodiment of the identification system 200 for identifying hierarchical overlapping location areas. For clarity, only the identification of the overlapping and hierarchical location areas will be described in detail because the same identification scheme is independently used for identifying the routing areas (see FIG. 8 for illustrative example). In comparing the second embodiment to the first embodiment of the identification system, the second embodiment effectively operates to reduce the amount of information broadcasted on a broadcast control channel as system information.

FIG. 7 illustrates in greater detail the contiguous location areas A–C and overlapping location areas D–F including location area identifiers LAI-A through LAI-F (top layer), codes 700 (middle layer) and combined codes 710 (bottom layer). For purposes of clarity, only the components and signals used for identifying and differentiating the contiguous location areas A–C (described first) and overlapping location areas D–F (described last) are discussed. It should be noted that cell 720 includes Location Areas C and D.

Referring to the contiguous location areas A–C, the signals generated by the mobile telecommunications network 100 to differentiate and identify the contiguous location areas A–C include the location area identifiers LAI-A through LAI-C, codes 700 and combined codes 710. The mobile terminal (e.g., MT 725) receives the signals in a predetermined manner (described below) so as to keep track of in which location area (e.g., Location Area A) the mobile terminal is currently located and registered for operations. Of course, the mobile telecommunications network 100 can accommodate multiple mobile terminals located throughout the mobile telecommunications network.

In the preferred second embodiment, the mobile terminal (e.g., MT 725) receives from the network one of the location area identifiers (e.g., location area identifier LAI-A) to initially identify the particular location area (e.g., location area A) in which the mobile terminal is currently located. Likewise, whenever the mobile terminal (e.g., MT 725) has roamed into another location area (e.g., location area B) and has initiated a location update to register for telephony operations then the mobile terminal receives another location area identifier (e.g., location area identifier LAI-B) from the network. Each of the location area identifiers LAI-A through LAI-C includes an identifier that is unique within the mobile telecommunications network 100. In addition, other identifiers such as network identifiers and country identifiers that make each location area identifier unique on a wider scope may be included.

Instead of continuously transmitting location area identifiers LAI-A through LAI-C that consume the valuable resources of the mobile telecommunications network 100, the mobile telecommunications network assigns a code 700 to each location area A–C which leads to the broadcasting of smaller combined codes 710 (described later) from each cell a–c in lieu of the location area identifiers. The codes 700 and combined codes 710 are used by the mobile terminal (e.g., MT 725) to identify and differentiate any one of the location areas (e.g., location area A) from neighboring location areas (e.g., location areas B and C).

The code 700 for each location area A–C contains a specific binary value having a predetermined length of bits, where the specific binary value is such that adjoining location areas (e.g., location areas A–C) do not have the same binary value. However, if the location areas (e.g., location areas A and F) are not adjoining then the binary values of the respective codes 700 may be the same. In other words, each code 700 may be repeated within the mobile telecommunications network 100 so long as there is a certain geographical separation (e.g., location areas A and F). For example, the codes 700 may have a predetermined length that is two bits long and then there would be four possible binary values including 00, 01, 10 and 11 that may be assigned to the location areas A–F by the mobile telecommunications network 100.

The predetermined length of the code 700 and corresponding number of possible binary values can vary depending on an acceptable reuse distance determined by an operator of the mobile telecommunications network 100. The example above describes four possible binary values that can be assigned to the location areas A–F, but other predetermined lengths (e.g., three bits) of the code 700 can be used resulting in a different number of possible binary values (e.g., eight binary values). In addition, an information field in the broadcasted system information can be used to indicate the predetermined length (e.g., two bits) of the code 700 to the mobile terminal (e.g., MT 725).

Furthermore, to simplify a connection between the location area identifiers (e.g., location area identifier LAI-A) and the binary values (e.g., binary value 00) of the codes 700, any particular binary value can be integrated into a particular location area identifier by setting the last two bits (above example) of the location area identifier to the same value as the respective binary value. Thus, when the mobile terminal (e.g., MT 725) roams into another location area (e.g., location area B) it is implicitly assigned another binary value, since the (during the location update process) explicitly assigned location area identifier (e.g., location area identifier LAI-B) includes the respective binary value (e.g., binary value 01) of the code 700. Otherwise, the particular binary value of the code 700 would have to be explicitly assigned to the mobile terminal (e.g., MT 725) in addition to the particular location area identifier whenever the mobile terminal initiates a location update.

As mentioned earlier, the binary values of the codes 700 are used to create the combined codes 710 (bottom layer) broadcast by the corresponding BTSS (FIG. 1) located in each cell a–f. More specifically, the combined code 710 has a binary length directly related to the possible number of binary values associated with the code 700. For example, when there are four possible binary values (e.g., binary values 00,01, 10 and 11) associated with the code 700 then the combined code 710 has a binary length of four bits.

Moreover, any particular combined code 710 has a binary value that is directly related to the binary value of the corresponding code 700. Preferably, the binary value of the combined code 710 is related to the binary value of the code 700 in a manner such that the setting of each bit of the combined code depends on the binary value of the code. For example, the first bit of the combined code 710 corresponds to one of the possible binary values of the code 700 so that if the code has a binary value 00 then the combined code would have a binary value of 1000. And, the second bit of the combined code 710 corresponds to another of the possible binary values of the code 700 so that if the code has a binary value of 01 then the combined code would have a binary value of 0100. Likewise, the third bit of the combined code 710 correspond to another of the possible binary values of the code 700 so that if the code has a binary value of 10 then the combined code would have a binary value of 0010. Lastly, the fourth bit of the combined code 710 corresponds to another of the possible binary values of the code 700 so that if the code has a binary value of 11 then the combined code would have a binary value of 0001. The advantage of using the combined codes 710 becomes especially advantageous when overlapping location areas D–F are used, as will be discussed later.

The fact that the binary values of the codes 710 assigned to each location area A–F may not be unique (see location areas A and F) within the mobile telecommunication network 100 can be problematic whenever the mobile terminal (e.g., MT 725) roams to other location areas. Because, the mobile terminal (e.g., MT 725) should continuously receive broadcast combined codes 710 (e.g., binary value 1000) from one of the cells (e.g., cell a) where the mobile terminal is currently located to assure that every transition to a new location area (e.g., location area B) is detected. However, if the mobile terminal (e.g., MT 725) fails to receive the broadcast combined code 710 or loses contact with the mobile telecommunications network 100 such as when the mobile terminal is turned off or there is insufficient radio coverage, then the mobile terminal may roam into another location area (e.g. location area F) broadcasting a combined code that indicates the presence of the same binary value of the code as the mobile terminal was assigned during the prior location update. In such an event, the mobile terminal (e.g., MT 725) is not able to detect that the mobile terminal has roamed into the new location area.

To solve the above mentioned problem, the mobile terminal (e.g., MT 725) may use a timer 727 (FIG. 1) to assure that the mobile terminal detects every transition or movement into a new location area (e.g., location area B). The mobile terminal (e.g., MT 725) resets and starts the timer 727 whenever the mobile terminal does not receive one of the broadcasted combined codes 710, and stops the timer whenever the mobile terminal receives one of the combined codes after an interruption. Therefore, during such an interruption if a predetermined amount of time expires before the timer 727 is stopped, then the mobile terminal (e.g., MT 725) initiates a location update with the mobile telecommunications network 100 whenever contact with the mobile telecommunications network is regained. The mobile terminal (e.g., MT 725) preferably initiates the location update to receive one of the location area identifiers LAI-A through LAI-F when the mobile terminal regains contact with the mobile telecommunications network 100.

In addition, the mobile terminal (e.g., MT 725) after exceeding the predetermined amount of time still initiates the location update even when the binary value of the combined code 710 received from the current cell indicates the presence of the same binary value of the code 700 as the mobile terminal was assigned during the prior location update. The mobile terminal (e.g., MT 725) initiates the location update in such a situation, because there is a possibility during the time when the mobile terminal was not able to receive the broadcasted combined code 710 that the mobile terminal may have roamed to another location area that has the same code 700.

The duration of the predetermined amount of time associated with the timer 727 may depend on a reuse distance of the codes 700 and a maximum roaming speed of the mobile terminal (e.g., MT 725) considered reasonable by the operator of the mobile telecommunications network 100. It should be understood that the use of the timer 727 in such a manner indicates that the mobile terminal (e.g., MT 725) may attempt to perform another location update even when the location update is not required.

It should also be understood that in referring to the routing areas, a second timer 827 (FIG. 8) may be used by the mobile terminal (e.g., MT 725) for the same purpose as the first timer 727 was used in association with the location areas. For example, the mobile terminal (e.g., MT 725) may use a second timer 827 (FIG. 8) to assure that the mobile terminal detects every transition or movement into a new routing area (e.g, Routing Area B'-FIG. 8).

Referring now to the overlapping location areas D–F, where a main distinction between the use of the contiguous location areas A–C and the overlapping location areas D–F is that the signals (e.g., codes 700 and combined codes 710) may have different binary values assigned for border cells 730 that are created by overlapping cells d–f.

The overlapping of the location areas (e.g., location areas D–F) creates the border cells 730 which incorporate two or more overlapping cells d–f. Each border cell 730 is assigned the multiple location area identifiers (e.g., location area identifiers LAI-D and LAI-F) and multiple codes 700 (e.g., binary values 10 and 00) of the two or more overlapping cells (e.g., cells d and f). As an illustration, one of the border cells 730 may be assigned the location area identifiers LAI-E and LAI-F, and codes 700 having binary values of 11 and 00. Moreover, each border cell 730 has one BTS (see FIG. 1) to broadcast the combined code 710 (described later) and to transmit the location area identifier to a mobile terminal during the location update procedure.

The combined code 710 of any border cell 730 is representative of the binary values of the multiple codes 700 associated with the individual cells forming the particular border cell. As an illustration, one of the border cells 730 may include two codes 700 having binary values of 11 and 00 which corresponds to the combined code 710 having a binary value of 1001. Likewise, if the particular codes 700 for a border cell (hypothetical) include the binary values of 00, 01 and 11 then the combined code 710 would have a binary value of 1101. And, if the particular codes 700 for a border cell (hypothetical) include the binary values of 00, 01, 10 and 11 then the combined code 710 would have a binary value of 1111.

Basically, the binary value of the combined code 710 is related to the binary values of the multiple codes 700 in a manner such that the settings of each bit of the combined code depends on the particular binary values of the codes (see FIG. 7 for further examples).

It should be understood that of the multiple location area identifiers assigned to a particular border cell 730 there is only one transmitted to the mobile terminal 220 during location update. In other situations, the location area identifiers are not transmitted at all.

As described earlier (first embodiment) the subscriber identity confidentiality feature of the GSM specification includes the TMSI temporary identifier that is unique within the one location area in which the TMSI temporary identifier was assigned. However, the TMSI temporary identifier may not be unique when used within the border cells 730 of the overlapping location areas D–F.

To solve the above-mentioned uniqueness problem, the TMSI temporary identifier can be appended with the binary value of the code 700 assigned to the particular location area in which the temporary identifier was initially associated with the mobile terminal (e.g., MT 725). The adding of the particular binary value of the code 700 to the TMSI temporary identifier should make the TMSI temporary identifier unique also in border cells. The appending of the TMSI temporary identifier and the particular code 700 does increase the length of the TMSI temporary identifier, however, it does not make the TMSI temporary identifier as physically long as if it were to be made globally unique or even network unique.

Generally, the binary value of the code 700 associated with the particular location area in which the TMSI temporary identifier was assigned to the mobile terminal (e.g., MT 725) can be appended to the TMSI temporary identifier whenever the mobile terminal enters any cell in which there is indicated the presence of at least one code having a binary value other than the binary value of the code assigned to the location area in which the mobile terminal was originally assigned the TMSI temporary identifier in addition to the presence of the binary value of the code assigned to the location area in which the mobile terminal was assigned the TMSI temporary identifier. Preferably to maintain the uniqueness of the temporary identifier, the location area identifier is combined with the temporary identifier at location update and the code 700 is combined with the temporary identifiers at other contacts (e.g., paging and access attempts) between the mobile terminal and the mobile telecommunications network 100.

Figure 8:
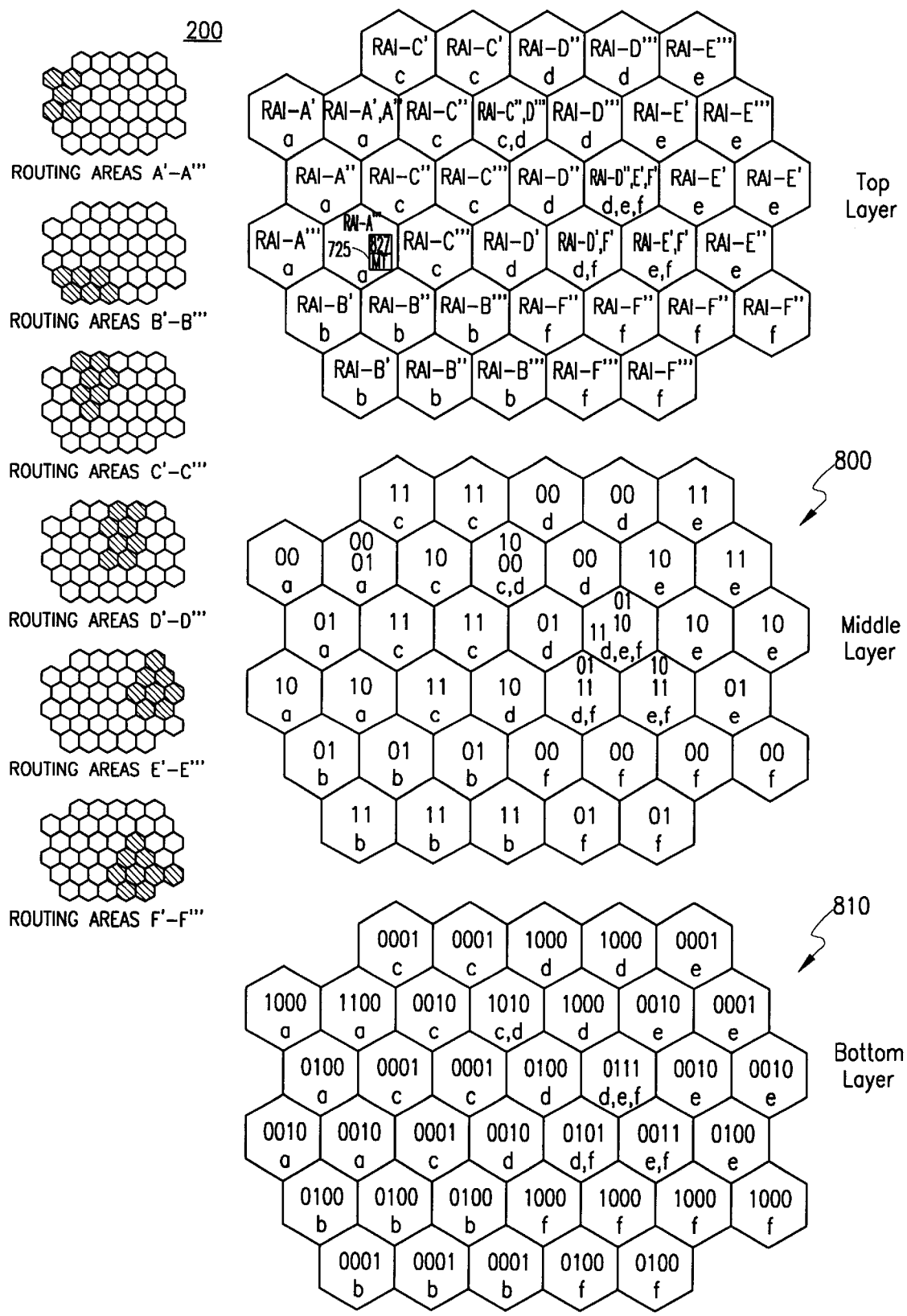
FIG. 8 is a diagram illustrating the second embodiment of the identification system for identifying hierarchial overlapping routing areas.

Referring to FIG. 8, there is illustrated the second embodiment of the identification system 200 for identifying hierarchical overlapping routing areas. As mentioned earlier, the identification scheme used to identify routing areas is independent of and similar to the scheme (described above) for identifying location areas. Therefore, a detailed description about the routing area identifiers, codes 800 and combined codes 810 will not be repeated, however, an illustrative example has been provided with respect to FIG. 8.

Also described earlier with respect to the first embodiment, the subscriber identity confidentiality feature of the GPRS specification includes the temporary logical link (TLLI) identifier that is unique within the SGSN service area (multiple routing areas) in which the temporary TLLI identifier was assigned. It should be understood that the temporary TLLI identifier is unique in the whole service area of a SGSN, not only within a single routing area. However, if a routing area crosses a SGSN service area border and also overlaps with another routing area in the adjacent SGSN service area, the TLLI identifier will not be unique when used in a cell that belongs to the service area of another SGSN than the SGSN that assigned the TLLI identifier to the mobile terminal and which cell also belongs to another overlapping routing area that is controlled by another SGSN than the SGSN that assigned the TLLI identifier to the mobile terminal. This may well happen, since a mobile terminal may roam within a routing area crossing a SGSN service area border, so that the mobile terminal crosses the SGSN service area border without crossing a routing area border and consequently without being assigned a new TLLI identifier.

In addressing the above-mentioned uniqueness problem, the TLLI identifier can be appended with the code 800 of the routing area in which the mobile terminal performed its prior routing update. This may or may not be the routing area in which the TLLI identifier was assigned, but in any case it will implicitly indicate the SGSN that assigned the TLLI identifier to the mobile terminal. Therefore, the mobile terminal (e.g., MT 725) can still use the TLLI feature when roaming in a cell located outside the service area of the SGSN that assigned the TLLI identifier to the mobile terminal and in which at least one code 800 is present other than the one assigned to the routing area where the mobile terminal performed its prior routing update.

Similar to the first embodiment, the service area flag 606 (FIG. 6) can be combined with a particular code 800 used to identify a particular routing area. The service area flag 606 is used to indicate whether a cell is outside the service area of the SGSN (FIG. 6) controlling the routing area identified by the code 800. This means that together with the combined code 810 for a routing area there should be a set of SGSN service area flags 606 (e.g., bits) for each routing area indicated by the combined code 810, to identify which cell belongs to each routing area and to indicate whether the cell is outside the service area of the SGSN in which the routing area belongs (e.g., the SGSN which assigns the TLLI temporary identifiers in that routing area).

Preferably, there is one service area flag for each routing area accommodated by a cell. This means that the number of the service area flags (i.e. bits) will vary according to the number of routing areas to which the cell belongs. To make the format consistent the number of service area flags (i.e. bits) can be chosen to always be the same number as the number of bits in the combined code 810. Of course, some of the service area flags 606 are redundant dummy flags, but the format of the parameter will be the same in every cell.

In using the codes 700 and 800 of the second embodiment, the virtual routing update described in the first embodiment can be eliminated. Because, in using only the single code 800 for a routing area makes it unnecessary to assign a new routing area identity to a mobile terminal (e.g., MT 725) even though the location area—and consequently the routing area identity—are changed. Again, this is possible since the codes 700 of the location areas and the codes 800 of the routing areas are independent.

In another variation of the invention, it is possible to have a configuration where the routing area is not divided by a border of the location area. This means that the concept of overlapping routing areas would not be fully introduced in the network, since the routing areas would be overlapping only within each location area. However, there are other consequences that may be seen as advantageous including, for example, all routing updates are real routing updates and no virtual routing updates are necessary.

Furthermore, the service area flag concept can be made unnecessary by making the borders of the SGSN service area coincide with the borders of the location areas. In this situation the routing area will always be located entirely within the service area of a single SGSN. Another way to avoid the SGSN service area flag concept is to require that a routing area must never be divided by a SGSN service area border. This, of course, means that routing areas are overlapping only within each SGSN service area.

From the foregoing, it can be readily appreciated by those skilled in the art that the present invention provides a mobile telecommunications network and method that combines the hierarchical location area feature associated with the GSM/GPRS standards and the overlapping feature associated with the PDC standard. There is also a need for a method and mobile telecommunications network that identifies the newly formed hierarchical overlapping radio coverage areas (e.g., location areas and routing areas).

Although two embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A mobile telecommunications network comprising:
a first switching center;

a second switching center;

a controller, coupled to the first switching center and the second switching center, for managing a plurality of location areas and a plurality of routing areas, said location areas and said routing areas are further controlled by the first switching center and the second switching center, respectively;

a plurality of cells, each cell accommodating at least one of said location areas and at least one of said routing areas; and an identification system for identifying at least one combination identifier representative of at least one location area identifier associated with said at least one of said location areas and at least one routing area identifier associated with said at least one of said routing areas, each of at least one combination identifier being assigned a respective combination number.

2. The mobile telecommunications network of claim 1, wherein said identification system further includes a plurality of transceiver stations controlled by said controller, each transceiver station is located in each cell and operable to broadcast said at least one location area identifier and said at least one routing area identifier.

3. The mobile telecommunications network of claim 1, wherein each location area identifier is further assigned a location number.

4. The mobile telecommunications network of claim 3, wherein said identification system further includes one of the location number and two of the at least one combination identifier when said cell accommodates one of the location areas and two of the routing areas.

5. The mobile telecommunications network of claim 3, wherein said identification system further includes two of the location number and two of the at least one combination identifier when said cell accommodates two of the location areas and one of the routing areas.

6. The mobile telecommunications network of claim 3, wherein said identification system further includes three of the location number and nine of the at least one combination identifier when said cell accommodates three of the location areas and three of the routing areas.

7. The mobile telecommunications network of claim 3, further comprising a mobile station for generating the at least one location number and the at least one combination identifier in response to receiving the at least one location area identifier and the at least one routing area identifier broadcast from the transceiver station in the cell where said mobile station is currently located.

8. The mobile telecommunications network of claim 7, further comprising means for appending a temporary mobile subscriber identity to one of the at least one location area identifier or the location number, where said one location area identifier and said location number corresponds with the location area where the temporary mobile subscriber identity was assigned to the mobile station.

9. The mobile telecommunications network of claim 7, further comprising means for attaching a service area flag to each routing area identifier, said service area flag is enabled when the mobile station is roaming outside a service area including at least one of the routing areas controlled by the second switching center that assigned a temporary logical link identity.

10. The mobile telecommunications network of claim 9, further comprising means for combining the temporary logical link identity to one of the at least one combination identifier or said combination number when the service area flag is enabled, where said one combination identifier and said one combination number corresponds with the location area and the routing area where the temporary logical link identity was assigned to the mobile station.

11. The mobile telecommunications network of claim 7, further comprising means for routing information between the first switching center and another first switching center when the mobile terminal is roaming in one of the location areas overlapping a location area of said another first switching center.

12. The mobile telecommunications network of claim 11, wherein said mobile terminal further includes means for originating a call by way of said another first switching center using the information from the first switching center.

13. The mobile telecommunications network of claim 7, further comprising means for routing information between the second switching center and another second switching center when the mobile terminal is roaming in one of the routing areas overlapping a routing area of said another second switching center.

14. The mobile telecommunications network of claim 13, wherein said mobile terminal further includes means for originating packet data transfers by way of said another second switching center using the information from the second switching center.

15. The mobile telecommunications network of claim 7, further comprising an interface, located between the first switching center and the second switching center, for informing the second switching center as to which one of the location area identifiers is currently used by the first switching center when the second switching center performs a coordinated routing update assigning one of the at least one routing area identifier.

16. The mobile telecommunications network of claim 7, wherein each cell includes a preferred location area stored as configuration data in the first switching center and the second switching center, said preferred location area used by the second switching center when performing an uncoordinated routing update assigning one of the at least one routing area identifier.

17. The mobile telecommunications network of claim 7, wherein said mobile terminal further includes means for initiating a coordinated routing update including a location update.

18. The mobile telecommunications network of claim 17, wherein said routing update further includes a real routing update and a virtual routing update, said real routing update used when the mobile terminal roamed into another one of the routing areas, and said virtual routing update used when the mobile terminal has roamed where only the routing area identifier has changed.

19. The mobile telecommunications network of claim 1, further comprising another second switching center including a second plurality of routing areas having a service area adjacent to a service area of the plurality of routing areas of the second switching center.

20. The mobile telecommunications network of claim 1, wherein said first switching center further includes a mobile service switching center.

21. The mobile telecommunications network of claim 1, wherein said second switching center further includes a serving general packet radio service support node.

22. The mobile telecommunications network of claim 1, wherein said controller further includes a selected one of a base station controller and a radio network controller.

23. A mobile telecommunications network comprising:
a mobile service switching center;
a serving general packet radio service support node;

a controller, coupled to the mobile service switching center and the serving general packet radio service support node, for managing a plurality of location areas and a plurality of routing areas, said location areas and said routing areas are controlled by the mobile service switching center and the serving general packet radio service support node, respectively;

a plurality of cells, each cell accommodating a combination of at least one of said location areas and at least one of said routing areas; and an identification system for identifying the combination of the at least one of said location areas and the at least one of said routing areas, said identification system including a transceiver station controlled by said controller and located in each cell, said transceiver station including means for broadcasting a combined location code representative of the at least one location area accommodated by each cell.

24. The mobile telecommunications network of claim 23, wherein said combined location code further includes at least one location code for differentiating any one of the locations areas from neighboring location areas.

25. The mobile telecommunications network of claim 24, further comprising a mobile station for generating the at least one location number and the at least one combination number and for detecting a transition from one to another of the at least one location area.

26. The mobile telecommunications network of claim 25, further comprising means for appending a temporary mobile subscriber identity to one of the at least one location code, where said one location code corresponds with the location area where the temporary mobile subscriber identity was assigned to the mobile station.

27. The mobile telecommunications network of claim 25, wherein said mobile station further includes means for initiating a location update with the first switching center using one of the at least one first location area identifier upon the detected transition from the one to the another of the at least one location area.

28. The mobile telecommunications network of claim 27, wherein said mobile station further includes a timer for triggering the location update upon expiration of a predetermined amount of time during which the mobile station did not receive the combined location code.

29. The mobile telecommunications network of claim 23, wherein each transceiver station further includes means for broadcasting a combined routing code representative of the at least one routing area accommodated by each cell.

30. The mobile telecommunications network of claim 29, wherein said combined routing code further includes at least one routing code for differentiating any one of the routing areas from neighboring routing areas.

31. The mobile telecommunications network of claim 29, further comprising a mobile station for receiving the broadcasted combined routing code and for detecting a transition from one to another of the at least one routing area.

32. The mobile telecommunications network of claim 31, further comprising means for combining a temporary logical link identity to one of the at least one routing code, where said one routing code corresponds with the routing area where the mobile station performed its prior routing update.

33. The mobile telecommunications network of claim 31, wherein said mobile station further includes means for initiating a routing update with the serving general packet radio service support node using one of the at least one routing area identifier upon the detected transition from the one to the another of the at least one routing area.

34. The mobile telecommunications network of claim 33, wherein said mobile station further includes a timer for triggering the routing update upon expiration of a predetermined amount of time during which the mobile station did not receive the combined routing code.

35. The mobile telecommunications network of claim 23, further comprising a second serving general packet radio service support node including a second plurality of routing areas having a service area adjacent to a service area of the plurality of routing areas of the serving general packet radio service support center.

36. The mobile telecommunications network of claim 23, wherein said controller further includes a selected one of a base station controller and a radio network controller.

37. A method for implementing and identifying hierarchical overlapping radio coverage areas used in a mobile telecommunications network, said method comprising the steps of:

managing a plurality of location areas using a first switching center;

managing a plurality of routing areas using a second switching center;

accommodating at least one of said location areas and at least one of said routing areas within a cell;

broadcasting at least one location area identifier representative of the at least one location area and broadcasting at least one routing area identifier representative of the at least one routing area accommodated by said cell;

generating at least one combination identifier representative of the broadcasted at least one location area identifier and the broadcasted at least one routing area identifier; and assigning each of said at least one combination identifier a respective combination number.

38. The method of claim 37, further comprising the step of assigning each location area identifier a location number.

39. The method of claim 37, wherein said step of generating further includes using a mobile station to generate the at least one combination identifier.

40. The method of claim 39, further comprising the step of appending a temporary mobile subscriber identity to one of the at least one location area identifier or the location number, where said one location area identifier and said location number corresponds with the location area where the temporary mobile subscriber identity was assigned to the mobile station.

41. The method of claim 39, further comprising the step of attaching a service area flag to each routing area identifier, said service area flag is enabled when the mobile station is roaming outside a service area including at least one of the routing areas controlled by the second switching center that assigned a temporary logical link identity.

42. The method of claim 41, further comprising the step of combining the temporary logical link identity to one of the at least one combination identifiers or said combination number when the service area flag is enabled, where said one combination identifier and said one combination number corresponds with the location area and the routing area where the mobile station performed its prior routing update.

43. The method of claim 39, further comprising the step of routing information between the first switching center and another first switching center when the mobile station is roaming in one of the location areas overlapping a location area of said another first switching center.

44. The method of claim 43, further comprising the step of originating a call from the mobile station by way of said another first switching center using the information from the first switching center.

45. The method of claim 39, further comprising the step of routing information between the second switching center and another second switching center when the mobile terminal is roaming in one of the routing areas overlapping a routing area of said another second switching center.

46. The method of claim 45, further comprising the step of originating packet data transfers from the mobile station by way of said another second switching center using the information from the second switching center.

47. The method of claim 39, further comprising the steps of interfacing the first switching center and the second switching center, and informing the second switching center as to which one of the location area identifiers is currently used by the first switching center when the second switching center performs a coordinated routing update assigning one of the at least one routing area identifier.

48. The method of claim 39, further comprising the step of storing a preferred location area for each cell as configuration data in the first switching center and the second switching center, said preferred location area used by the second switching center when performing an uncoordinated routing update assigning one of the at least one routing area identifier.

49. The method of claim 39, further comprising the step of initiating a coordinated routing update including a location update.

50. The method of claim 49, further comprising the step of classifying said routing update into a real routing update and a virtual routing update, said real routing update used when the mobile terminal roamed into another one of the routing areas, and said virtual routing update used when the mobile terminal roamed where only the routing area identifier has changed.

51. The method of claim 37, wherein said step of generating further includes broadcasting a combined location code representative of the at least one location area accommodated by said cell.

52. The method of claim 37, wherein said step of broadcasting further includes classifying the combined location code to include at least one location code for differentiating any one of the locations areas from neighboring location areas.

53. The method of claim 51, further comprising the steps of receiving the broadcast combined location code and detecting a transition from one to another of the at least one location area using a mobile station.

54. The method of claim 53, further comprising the step of appending a temporary mobile subscriber identity to one of the at least one location code, where said one location code corresponds with the location area where the temporary mobile subscriber identity was assigned to the mobile station.

55. The method of claim 53, further comprising the step of initiating a location update with the first switching center using one of the at least one first location area identifier upon the detected transition from the one to the another of the at least one location area.

56. The method of claim 55, further comprising the step of triggering the location update upon expiration of a predetermined amount of time during which the mobile station did not receive the combined location code.

57. The method of claim 37, wherein the step of generating further includes transmitting a combined routing code representative of the at least one routing area accommodated by said cell.

58. The method of claim 37, wherein said step of broadcasting further including defining the combined routing code to include at least one routing code for differentiating any one of the routing areas from neighboring routing areas.

59. The method of claim 57, further comprising the steps of receiving at a mobile station the broadcast combined routing code and detecting at the mobile station a transition from one to another of the at least one routing area.

60. The method of claim 59, further comprising the step of combining a temporary logical link identity to one of the at least one routing code, where said one routing code corresponds with the routing area where the mobile station performed its prior routing update.

61. The method of claim 59, further comprising the step of initiating a routing update with the second switching center using one of the at least one routing area identifier upon the detected transition from the one to the another of the at least one routing area.

62. The method of claim 61, further comprising the step of triggering the routing update upon expiration of a predetermined amount of time during which the mobile station did not receive the combined routing code.

63. The method of claim 37, further comprising the step of incorporating another second switching center including a second plurality of routing areas having a service area adjacent to a service area of the plurality of routing areas of the second switching center.

64. A mobile telecommunications network comprising:
   a service switching center;
   a service support node;
   a controller, coupled to said service switching center and said service support node, for managing at least one location area and at least one routing area, said at least one location area and said at least one routing area are further controlled by said service switching center and said service support node, respectively;
   a plurality of cells, each of said plurality of cells accommodating said at least one location area and said at least one routing area; and
   an identification system for identifying at least one combination identifier representative of at least one location area identifier associated with said at least one location area and at least one routing area identifier associated with said at least one routing area, each of said at least one combination identifier being assigned a respective combination number.

65. The mobile telecommunications network of claim 64, wherein said identification system further includes at least one transceiver station controlled by said controller, each of said at least one transceiver station is located in each of said plurality of cells and operable to broadcast said combination number associated with said each of said at least one combination identifier.

66. The mobile telecommunications network of claim 64, wherein said identification system further includes at least one transceiver station controlled by said controller, each of said at least one transceiver station is located in each of said plurality of cells and operable to broadcast said at least one location area identifier and said at least one routing area identifier.

67. The mobile telecommunications network of claim 66, wherein each of said at least one location area identifier is further assigned a location number.

68. The mobile telecommunications network of claim 67, further comprising a mobile station for generating said location number and said at least one combination identifier in response to receiving said at least one location area identifier and said at least one routing area identifier broadcast from said at least one transceiver station in a cell within said plurality of cells where said mobile station is currently located.

69. The mobile telecommunications network of claim 68, further comprising means for appending a temporary mobile subscriber identity to said at least one location area identifier or to the assigned location number, where said at least one location area identifier and said assigned location number corresponds with the location area where the temporary mobile subscriber identity was assigned to said mobile station.

70. The mobile telecommunications network of claim 69, further comprising means for attaching a service area flag to each routing area identifier, said service area flag is enabled when said mobile station is roaming outside a service area, wherein said service area includes at least one of the routing areas controlled by said service support node that assigned a temporary logical link identity.

71. The mobile telecommunications network of claim 70, further comprising means for combining said temporary logical link identity to one of said at least one combination identifier or the assigned combination number when said service area flag is enabled, where said at least one combination identifier and said assigned combination number corresponds with said at least one location area and said at least one routing area where said temporary logical link identity was assigned to said mobile station.

72. The mobile telecommunications network of claim 68, further comprising means for routing information between said service switching center and another service switching center when said mobile station is roaming in said at least one location area of said service switching center overlapping a location area of said another service switching center.

73. The mobile telecommunications network of claim 72, wherein said mobile station further includes means for originating a call by said another service switching center using the information from said service switching center.

74. The mobile telecommunications network of claim 68, further comprising means for routing information between said service support node and another service support node when said mobile station is roaming in said at least one location area of said service support node overlapping a location area of said another service support node.

75. The mobile telecommunications network of claim 74, wherein said mobile station further includes means for originating packet data transfers by said another service support node using the information from said service support node.

76. The mobile telecommunications network of claim 68, further comprising an interface between said service switching center and said service support node, said service support node is informed via said interface as to which one of said at least one location area identifiers is currently used by said service switching center when said service support node performs a coordinated routing update assigning one of said at least one routing area identifier.

77. The mobile telecommunications network of claim 68, wherein each of said plurality of cells include preferred location area stored as configuration data in said service switching center and said service support node, said preferred location area used by said service support node when performing an uncoordinated routing update assigning one of said at least one routing area identifier.

78. The mobile telecommunications network of claim 68, wherein said mobile station further includes means for initiating a coordinated routing update including a location update.

79. The mobile telecommunications network of claim 78, wherein said routing update further includes a real routing update and a virtual routing update, said real routing update is used when said mobile station is roaming in said at least one routing area within said service support node, and said virtual routing update is used when said mobile station is roaming in said routing area where said routing area identifier has changed.

80. The mobile telecommunications network of claim 64, further comprising another service support node including at least one routing area, said another service support node having a service area adjacent to a service area of said at least one routing area of said service support node.

81. The mobile telecommunications network of claim 64, wherein said service switching center further comprises a mobile service switching center.

82. The mobile telecommunications network of claim 64, wherein said service support node further comprises a serving general packet radio service support node.

83. The mobile telecommunications network of claim 64, wherein said controller is selected from the group consisting of a base station controller and a radio network controller.

84. The mobile telecommunications network of claim 64, wherein said at least one transceiver station includes means for broadcasting a combined location code representative of said at least one location area accommodated by each of said plurality of cells, said at least one transceiver station further includes means for broadcasting a combined routing code representative of said at least one routing area accommodated by each of said plurality of cells.

85. The mobile telecommunications network of claim 84, further comprising a mobile station for generating said location number and said combination number and for detecting a transition from a location area within said at least one location area and another location area.

86. The mobile telecommunications network of claim 85, wherein said mobile station further includes a timer for triggering a location update or a routing update upon expiration of a predetermined amount of time during which said mobile station did not receive said combined location code or said combined routing code, respectively.

* * * * *

UNITED STATES PATENT AND TRADEMARK OFFICE
CERTIFICATE OF CORRECTION

PATENT NO.    : 6,275,706 B1                                            Page 1 of 1
DATED         : August 14, 2001
INVENTOR(S)   : Johan Rune It is certified that error appears in the above-identified patent and that said Letters Patent is hereby corrected as shown below:

<u>Column 6,</u>
Line 3, replace "RAI – A'A"
  with -- RAI – A"A --

<u>Column 7,</u>
Line 63, replace "RAI – LH"
  with -- RAI – 1H --

<u>Column 12,</u>
Line 45, replace "BTSS"
  with --  BTSs --

Signed and Sealed this

Twenty-eighth Day of January, 2003

JAMES E. ROGAN
*Director of the United States Patent and Trademark Office*